(12) United States Patent
Delehouze et al.

(10) Patent No.: US 12,522,542 B2
(45) Date of Patent: Jan. 13, 2026

(54) METHOD FOR MANUFACTURING A HOLLOW PART MADE OF METAL MATRIX OR CERAMIC MATRIX COMPOSITE REINFORCED WITH SHORT FIBERS

(71) Applicant: SAFRAN CERAMICS, Le Haillan (FR)

(72) Inventors: Arnaud Delehouze, Moissy-Cramayel (FR); Eric Bouillon, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 282 days.

(21) Appl. No.: 18/248,652

(22) PCT Filed: Oct. 12, 2021

(86) PCT No.: PCT/FR2021/051767
§ 371 (c)(1),
(2) Date: Apr. 11, 2023

(87) PCT Pub. No.: WO2022/084602
PCT Pub. Date: Apr. 28, 2022

(65) Prior Publication Data
US 2023/0382813 A1    Nov. 30, 2023

(30) Foreign Application Priority Data
Oct. 20, 2020    (FR) ........................................ 2010738

(51) Int. Cl.
C04B 35/80    (2006.01)
B22F 3/22    (2006.01)
(Continued)

(52) U.S. Cl.
CPC .............. *C04B 35/80* (2013.01); *B22F 3/225* (2013.01); *B22F 5/04* (2013.01); *B22F 5/10* (2013.01);
(Continued)

(58) Field of Classification Search
CPC ..... C04B 38/00; C04B 38/0022; C04B 35/80; C04B 35/638; C04B 35/64;
(Continued)

(56) References Cited

U.S. PATENT DOCUMENTS

| | | | |
|---|---|---|---|
| 5,910,095 A | 6/1999 | Strasser et al. | |
| 2020/0270180 A1 | 8/2020 | Gimat et al. | |
| 2021/0146437 A1* | 5/2021 | Danis .................... | B22F 3/1021 |

FOREIGN PATENT DOCUMENTS

| | | |
|---|---|---|
| FR | 2 996 549 A1 | 4/2014 |
| FR | 3 086 566 A1 | 4/2020 |
| WO | WO 2019/016447 A1 | 1/2019 |

OTHER PUBLICATIONS

English translation of FR2996549 (Year: 2014).*
(Continued)

*Primary Examiner* — Christina A Johnson
*Assistant Examiner* — Xue H Liu
(74) *Attorney, Agent, or Firm* — Pillsbury Winthrop Shaw Pittman LLP

(57) ABSTRACT

A method for manufacturing a hollow part made of ceramic matrix or metal matrix composite, includes preparing a raw material including short fibers and a ceramic matrix precursor charge, positioning a sacrificial core in a molding cavity of injection-molding equipment, shaping the raw material by injection molding the raw material into the free space between the sacrificial core and an internal wall of the cavity to obtain a green part including the sacrificial core and the shaped raw material, extracting the green part from the (Continued)

equipment, densifying the raw material by flash sintering of the green part to transform the charge into a ceramic matrix, removing the sacrificial core to obtain a hollow part made of ceramic matrix or metal matrix composite, wherein the sacrificial core is coated with a flexible graphite sheet, with a graphite layer deposited by spraying or with a boron nitride paint layer before the injecting.

6 Claims, 5 Drawing Sheets

(51) Int. Cl.
    *B22F 5/04*     (2006.01)
    *B22F 5/10*     (2006.01)
    *C04B 35/638*     (2006.01)
    *C04B 35/64*     (2006.01)
    *B22F 3/105*     (2006.01)

(52) U.S. Cl.
    CPC ............ *C04B 35/638* (2013.01); *C04B 35/64* (2013.01); *B22F 3/105* (2013.01); *B22F 2003/1051* (2013.01); *B22F 2005/103* (2013.01); *B22F 2998/10* (2013.01); *C04B 2235/5224* (2013.01); *C04B 2235/5244* (2013.01); *C04B 2235/5248* (2013.01); *C04B 2235/6022* (2013.01); *C04B 2235/6028* (2013.01)

(58) Field of Classification Search
    CPC .... C04B 2235/5224; C04B 2235/5244; C04B 2235/5248; C04B 2235/6022; C04B 2235/6028
    USPC .......................................................... 264/610
    See application file for complete search history.

(56) References Cited

OTHER PUBLICATIONS

International Search Report as issued in International Patent Application No. PCT/FR2021/051767, dated Jan. 26, 2022.
Ye, et al., "Fabrication of metal matrix composites by metal injection molding—A review," A Journal of Materials Processing Technology, Elsevier, vol. 200, Nos. 1-3, Nov. 2007, XP022510603, pp. 12-24.

\* cited by examiner

[Fig. 1]
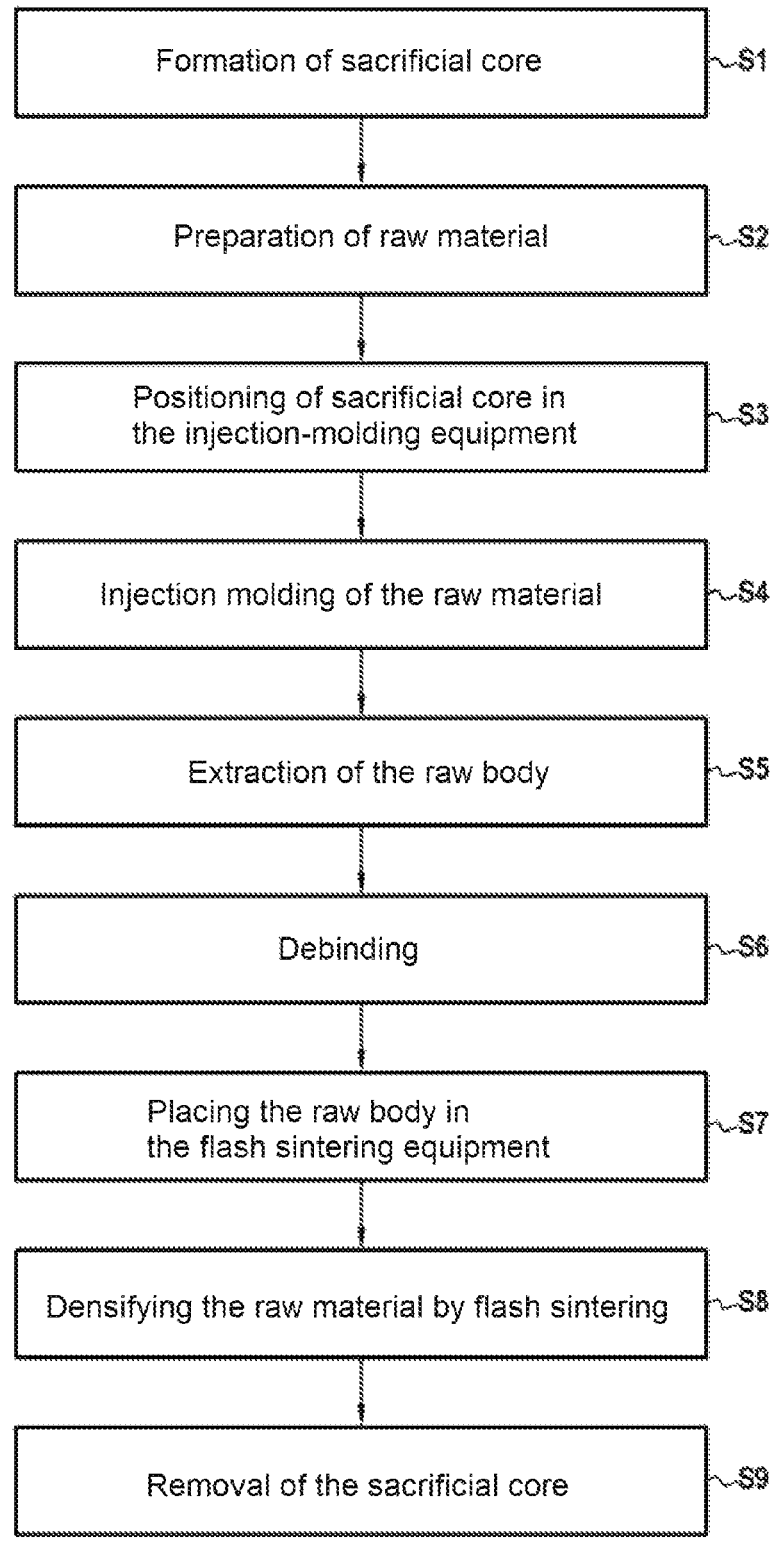

[Fig. 2]
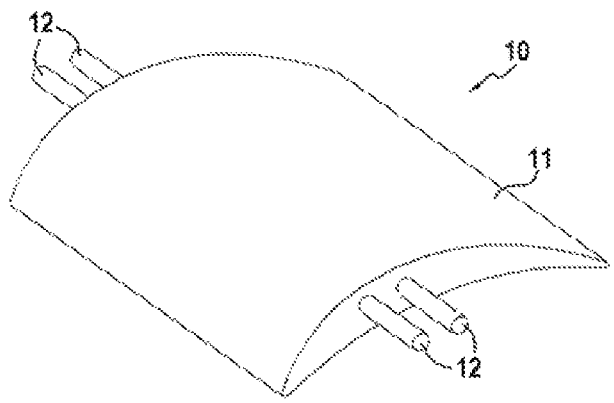
[Fig. 3]
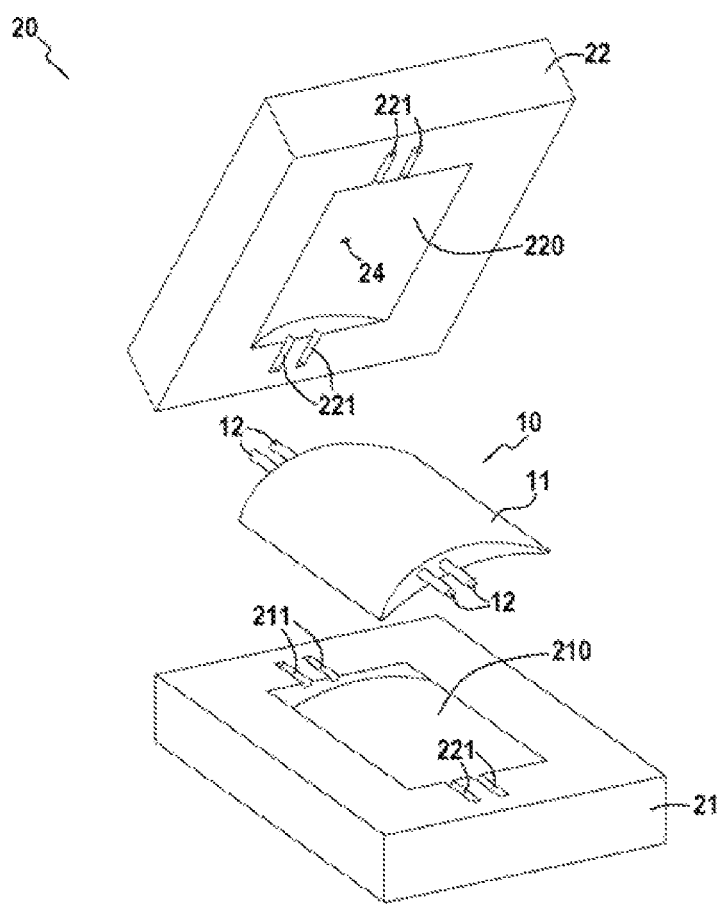

[Fig. 4]
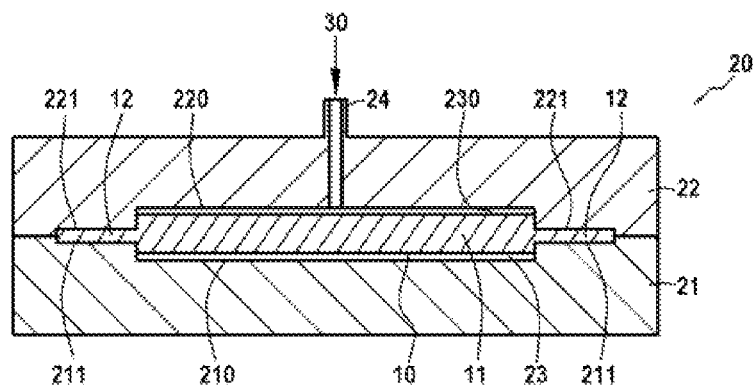
[Fig. 5]
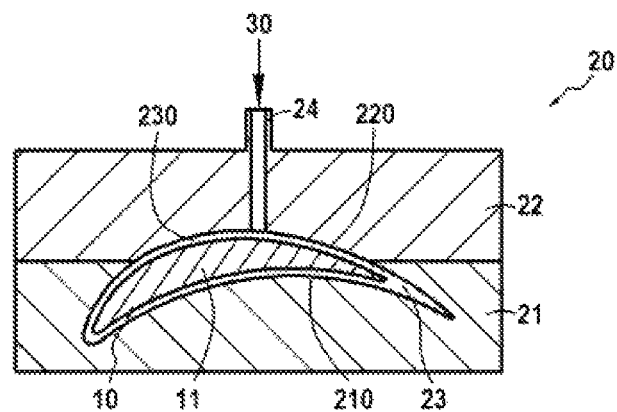

[Fig. 6]
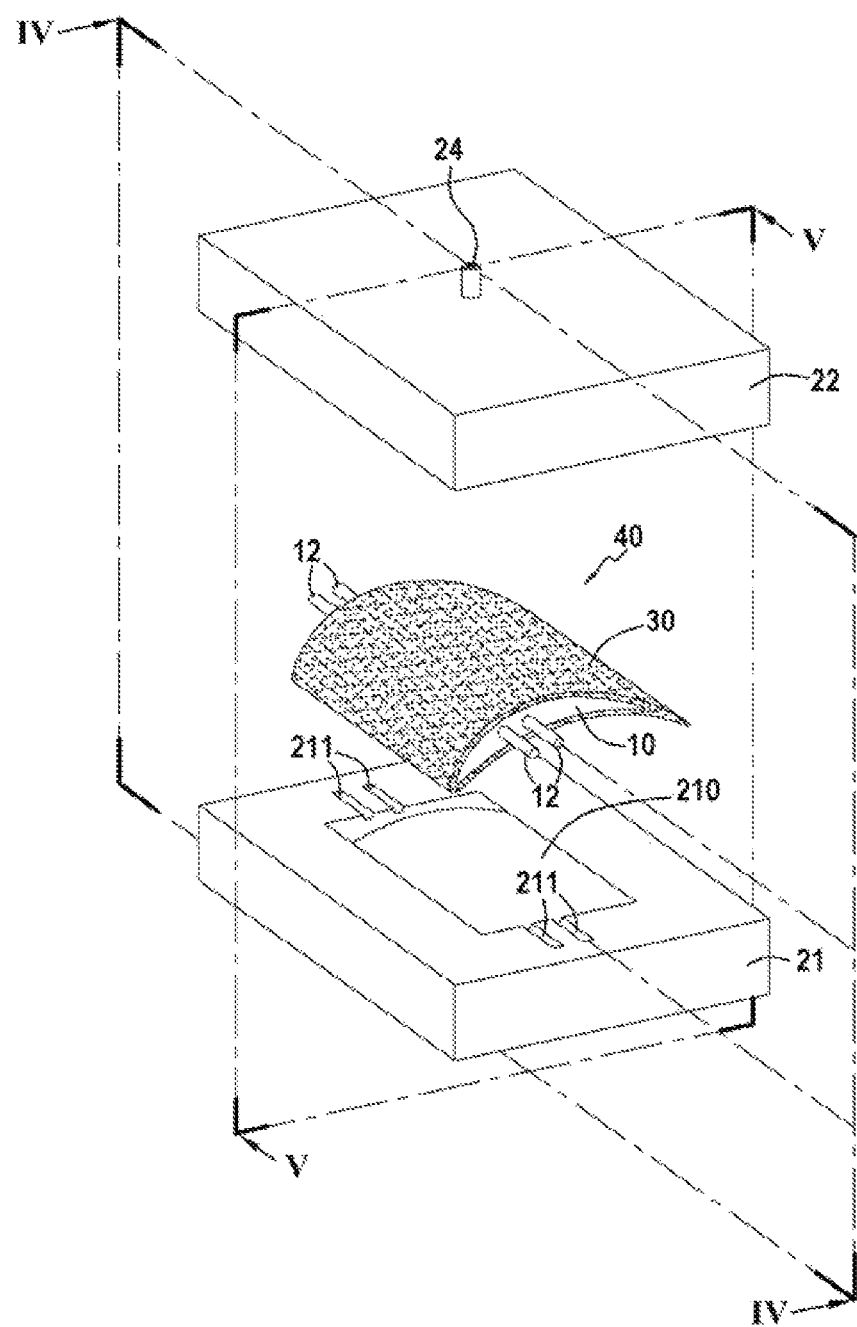

[Fig. 7]
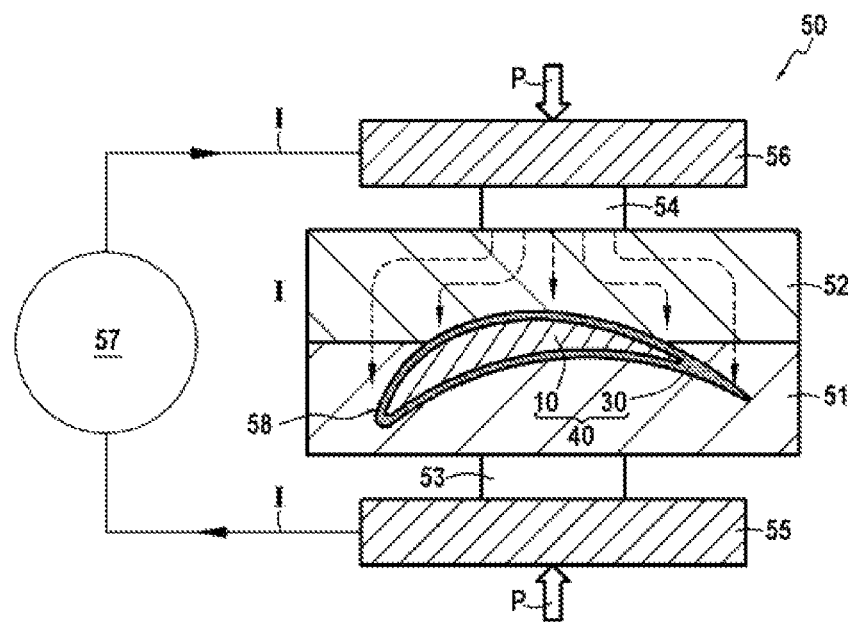
[Fig. 8]
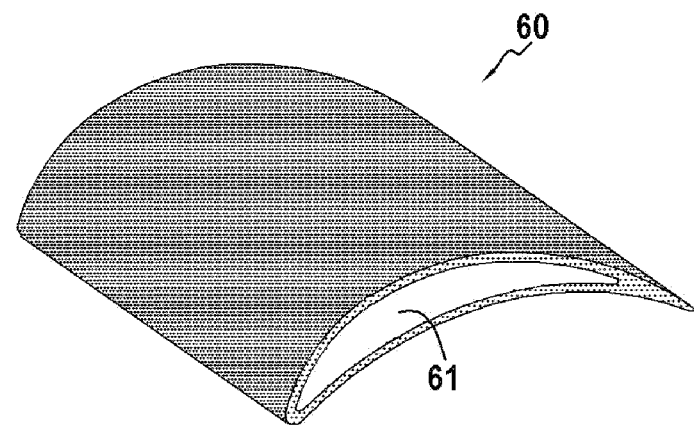

METHOD FOR MANUFACTURING A HOLLOW PART MADE OF METAL MATRIX OR CERAMIC MATRIX COMPOSITE REINFORCED WITH SHORT FIBERS

CROSS-REFERENCE TO RELATED APPLICATIONS

This application is the U.S. National Stage of PCT/FR2021/051767, filed Oct. 12, 2021, which in turn claims priority to French patent application number 20 10738 filed Oct. 20, 2020. The content of these applications are incorporated herein by reference in their entireties.

TECHNICAL FIELD

The present invention relates to the general field of the manufacture of hollow parts made of metal matrix or ceramic matrix composite.

PRIOR ART

Ceramic (CMC) matrix or metal (MMC) matrix composites are materials consisting of a fibrous reinforcement densified by a ceramic matrix or metal matrix. These materials have a high level of performance in terms of stiffness and resistance to high temperature.

A field of application of the invention is the manufacture of hollow parts used in the hot portions of a turbomachine, for example parts of the turbine, of the afterbody or of the secondary nozzles of the turbomachine. More specifically, the invention can be used for producing distributors or hollow turbine blades.

A turbine stage consists of a fixed vane or distributor belonging to a stator, followed by a mobile vane belonging to a rotor. The first stages of the distributor are generally hollow in order to route air radially from the outside to the inside of the turbine, so as to supply the hub with air to ensure its pressurization and purging as well as its possible cooling. A portion of this air can be intended for cooling the distributor.

Moreover, the moving blades can also be hollow so that cooling air can pass therethrough. The use of hollow parts also allows to reduce the mass of the turbomachine.

Document US2020270180 discloses a method for manufacturing hollow CMC parts which consists of forming a fibrous preform around a core, consolidating the preform and eliminating the core.

In document US2020270180, the fibrous preform is formed with continuous fibers by draping fibrous textures around the core or by weaving a preform including a hollow zone intended for the insertion of the core.

The solution described in document US2020270180 uses strata or structures woven with continuous fibers which intrinsically have a hold or cohesion which allows them to be shaped around a core before consolidation.

The solution disclosed in document US2020270180 cannot be transposed to the manufacture of a hollow CMC part from short fibers which are discontinuous by definition and cannot be woven together to form a coherent fibrous structure.

The short fibers allow to obtain parts of small dimensions. Short fibers also allow the manufacture of composite parts directly in their net shape or near net shape.

It would therefore be desirable to have a solution allowing to manufacture hollow parts made of CMC or MMC with short fibers.

DISCLOSURE OF THE INVENTION

The object of the present invention is therefore to overcome the aforementioned disadvantages by proposing a method for manufacturing a hollow part made of ceramic matrix or metal matrix composite, comprising the following steps:
- preparing a raw material comprising at least short fibers and a ceramic matrix or metal matrix precursor charge,
- positioning a sacrificial core in a molding cavity of injection-molding equipment, the molding cavity having dimensions larger than the dimensions of the sacrificial core,
- shaping the raw material by injection molding said raw material into the free space between the sacrificial core and an internal wall of the molding cavity so as to obtain a green part comprising the sacrificial core and the shaped raw material,
- extracting the green part from the injection-molding equipment,
- densifying the raw material by flash sintering of the green part so as to transform the charge into a ceramic matrix or into a metal matrix,
- removing or eliminating the sacrificial core so as to obtain a hollow part made of ceramic matrix or metal matrix composite.

The manufacturing method of the invention advantageously combines the use of a sacrificial core with the techniques of injection molding and densification by flash sintering. Indeed, the sacrificial core serves both as a counter-mold during the shaping step to define the shape and dimensions of the cavity to be formed and of the final part ("net shape") and as a conductor which participates in the sintering of the particles of the matrix precursor charge.

The method of the invention allows to manufacture hollow parts made of CMC or MMC composite with short fiber reinforcement, even for parts of small dimensions and/or having a complex geometry.

According to a first aspect of the method of the invention, the sacrificial core has a geometry capable of being unmolded from the densified raw material after the densification step. In this case, the sacrificial core can be coated with a flexible graphite sheet, with a graphite layer deposited by spraying or with a boron nitride paint layer before the step of injecting the raw material in order to facilitate its mechanical removal.

According to a second aspect of the method of the invention, the sacrificial core is eliminated by chemical treatment. This allows to use cores that have complex geometries that cannot be unmolded (undercuts) and to form parts with any shape of cavity.

According to a third aspect of the method of the invention, the sacrificial core is made with one of the following materials: graphite, zirconia and alumina.

According to a fourth aspect of the method of the invention, the raw material comprises a ceramic matrix precursor charge and short fibers made of a material selected from one of the following materials: carbon, silicon carbide and alumina.

According to a fifth aspect of the method of the invention, the raw material comprises a metal matrix precursor charge and short fibers made of a material selected from one of the following materials: silicon carbide and alumina. A metal charge, typically silicon, can further be added to the raw material to promote the final densification.

According to a sixth aspect of the method of the invention, at least one diffusion barrier layer is deposited on the sacrificial core before the injection of the raw material. This allows to avoid possible chemical interactions between the material of the sacrificial core and the material(s) used in the raw material to form the matrix.

According to a seventh aspect of the method of the invention, the raw material further comprises a binder, the method further comprising a step of debinding the raw material before or during the densification of the raw material. This allows to eliminate the presence of organic material in the composite of the final part.

BRIEF DESCRIPTION OF THE DRAWINGS

FIG. 1 is a flowchart showing the steps of a method for manufacturing a hollow part made of ceramic matrix or metal matrix composite with short fiber reinforcement according to the invention, FIG. 2 is a schematic perspective view of a sacrificial core in accordance with one embodiment of the invention, FIG. 3 is a schematic exploded perspective view showing the positioning of a sacrificial core in an injection-molding equipment in accordance with one embodiment of the invention, FIG. 4 is a sectional view of the equipment of FIG. 3 once closed, FIG. 5 is another sectional view of the equipment of FIG. 3 once closed, FIG. 6 is a schematic exploded perspective view showing the extraction of a green part from the equipment of FIGS. 3, 4 and 5, FIG. 7 is a schematic sectional view of a flash sintering equipment in which the green part of FIG. 6 is placed, FIG. 8 is a schematic perspective view of a hollow part made of ceramic matrix or metal matrix composite with short fiber reinforcement after removal of the sacrificial core.

DESCRIPTION OF EMBODIMENTS

As shown in FIG. 1, the method for manufacturing a part made of ceramic matrix composite (CMC) or of metal matrix composite (MMC) according to the invention begins with the production of a sacrificial core 10 (step S1, FIG. 2). In accordance with the invention, the sacrificial core is made of a material compatible with the manufacturing steps of the method of the invention and of the desired final material, the material of the core preferably having thermochemical compatibilities with the composite of the part. The constituent material of the sacrificial core also has mechanical and thermal properties allowing it to withstand the pressures and temperatures used during the manufacture of the part as described below. The sacrificial core can also be electrically conductive to participate in the heating of the green part during the flash sintering step SPS. The sacrificial core material must also be easily removable or able to be eliminated without damaging the final part. For this purpose and in a non-limiting manner, the sacrificial core can be made of graphite, alumina or zirconia.

As illustrated in FIG. 2, the sacrificial core 10 comprises a body 11 which has a geometry and dimensions corresponding to those of the hollow or of the cavity that is to be formed in the final CMC or MMC part. The core 10 further comprises positioning pins or overlengths 12 which extend from the body 11 and which are intended to facilitate the holding in position of the sacrificial core in an injection-molding equipment as explained below. The sacrificial core can be obtained by machining or any other means known to the person skilled in the art.

The next step consists in preparing a raw material (also called "feedstock") comprising (step S2) at least short fibers and a ceramic matrix or metal matrix precursor charge. The raw material may further comprise a binder, which is the case in the example described here.

The short fibers here have a length comprised between 50 mm and 100 mm. Short fibers allow the manufacture of CMC or MMC parts directly in their net shape or near net shape. In the case of an MMC part, the short fibers allow to have an isotropic or transverse isotropic reinforcement which allows to improve the creep resistance of the metal matrix of the part. This improves the rigidity of the MMC part at high temperature while reducing its density, which allows to increase the specific mechanical properties.

In the case of the manufacture of a hollow CMC part, the raw material comprises a ceramic matrix precursor charge and short fibers made of a material selected from one of the following materials: carbon, silicon carbide, alumina, mullite and magnesia. The ceramic matrix precursor charge consists of a powder of refractory ceramic particles, for example particles of silicon carbide, boron nitride ($Si_3N_4$) or any mixture of ceramic powders.

In the case of the manufacture of a hollow MMC part, the raw material comprises a metal matrix precursor charge and short fibers made of a material selected from one of the following materials: silicon carbide and alumina. The metal matrix precursor charge consists of a powder of metal particles, in particular particles of titanium alloy, nickel alloy or aluminum alloy.

The binder consists of at least one polymeric binder such as, for example, polyethylene glycol (PEG), stearic acid, polypropylene, or else a formulation based on polyoxymethylene (POM).

The method continues with the positioning of the sacrificial core 10 in a molding cavity 23 of injection-molding equipment 20 as illustrated in FIG. 4 (step S3). More specifically, the injection-molding equipment 20 comprises a first half-shell 21 including an imprint 210 and a second half-shell 22 including an imprint 220. When the equipment 20 is closed by joining the two half-shells 21 and 22 (FIGS. 4 and 5), the imprints 210 and 220 delimit a molding cavity 23 having dimensions larger than the dimensions of the sacrificial core 10 in order to provide an injection space between the external surface of the core and the wall of the molding cavity. Housings 211 and 221 also extend respectively from the imprints 210 and 220. The housings 211 and 221 are intended to cooperate with overlengths 12 of the sacrificial core 10 so as to hold the core in position in the molding cavity to form an injection space 230 between the core and the wall of the imprints 210 and 220 for the raw material (FIGS. 4 and 5). The injection space 230 is dimensioned according to the final thickness of the material of the target part, taking into account in particular the influence of sintering and of any debinding on the geometric variation of the part.

The raw material is then shaped by the injection molding technique (step S4). More specifically, once the injection-molding equipment 20 is closed with the sacrificial core 10 positioned inside, a raw material 30 prepared in step S2 is injected into the free space 230 between the sacrificial core 10 and the internal wall of the molding cavity 23 via an injection port 30 (FIGS. 4 and 5).

Once the injection of the raw material is complete, a green part 40 is obtained, also called a "green body", comprising the sacrificial core 10 coated on its external surface with a layer of shaped raw material 30 (FIG. 6).

The green part 40 is then extracted (unmolded) from the injection-molding equipment (FIG. 6, step S5).

When the raw material comprises a binder, a step of debinding the raw material is carried out before the step of placing the green part in the flash sintering equipment so as to eliminate the organic material from the composite to be manufactured (step S6). The debinding step can be carried out by solvent route, thermal route under inert gas, a combination of these two routes, etc. The debinding can also be carried out directly in situ in the flash sintering equipment by a suitable treatment carried out before the flash sintering.

The green part 40 is placed in a flash sintering equipment or SPS ("Spark Plasma Sintering") 50 (FIG. 7, step S7). The difference between conventional hot pressing and flash sintering is that the heat source is not external but an electrical (direct-pulsed direct-or alternating) current applied via electrodes is passed through a conductive mold. "Flash sintering" consists of heat treatment under mechanical stress using an equipment to enclose the green part. The application of the heat is carried out by Joule effect as close as possible to the green part by the passage of an electric current, which allows to quickly close the porosity and to very quickly reach a maximum rate of densification (formation of bonds between grains without total fusion of the latter). This weld, produced by diffusion of material, is accompanied by densification, that is to say a reduction in the level of porosity and hardening which confers cohesion on the shaped raw material. The flash sintering equipment 50 allows to subject the raw material 30 to pulses (3.3 ms) of direct electric current (typically 0-25 V, 1-20 kA) while applying a pressure of several tens of MPa (up to 300 MPa) in a range of temperatures varying from ambient temperature to 2500° C. Flash sintering is generally carried out under vacuum but it is possible to work under an inert atmosphere (nitrogen, argon).

The flash sintering equipment 50 comprises for this purpose a mold formed by two half-shells 51 and 52 made of an electrically conductive material such as graphite. The two half-shells 51 and 52 define therebetween a molding cavity, which may have a complex shape, the dimensions of which are defined according to the dimensions of the final part to be produced. The sacrificial core plays here the role of counter-mold to ensure the densification of the internal walls of the final part.

The equipment 50 comprises first and second electrodes 55 and 56 connected, on the one hand, to a current generator 57 and, on the other hand, to the half-shells 51 and 52 of the mold respectively via a first piston 53 and a second piston 54. In the case of the formation of a part having a complex geometry, a key equipment can be used. The generator 57 emits a current I which circulates through all the equipment namely the electrodes 56 and 57, the pistons 53 and 54 and the half-shells 51 and 52, but also the charge of the raw material 30 and the sacrificial core 10. A mechanical stress P is further applied to the half-shells 51 and 52 by the pistons 53 and 54 during sintering.

The parameters of the densification cycle, namely mainly the intensity of the electric current, the value of the mechanical stress applied and the nature of the treatment atmosphere, are defined by the nature of the elements to be sintered of the raw material and are well known to the person skilled in the art. The electric current is controlled according to the defined thermal cycles (temperature rise/fall ramps, stages, etc.). The mechanical stress can also be controlled if necessary (release/application of stress).

The molds used are preferably made of graphite and are separated from the powder by a graphite sheet to avoid any sticking or by any other means known to the person skilled in the art, such as in particular a graphite layer deposited by spraying or a boron nitride paint layer.

Once the raw material has been densified by flash sintering around the sacrificial core 10 (step S8), the preform obtained is extracted from the equipment 50. The next step consists in removing or eliminating the sacrificial core (step S9). If its geometry allows it, that is to say if the core does not have an undercut, the core can be removed mechanically. In order to facilitate mechanical removal, the sacrificial core may be wrapped or coated with a flexible graphite sheet, a spray-deposited graphite layer or a boron nitride paint layer before the step of shaping the raw material by injection molding.

The sacrificial core can also be removed by thermochemical treatment. In the case, for example, of a sacrificial graphite core, the latter can be eliminated by thermochemical oxidation treatment carried out, for example, in air at a temperature comprised between 400° C. and 600° C. if the material of the part allows it.

After the removal or elimination of the sacrificial core, a part 60 made of ceramic matrix or metal matrix composite reinforced with short fibers is obtained, the part including an internal recess 61 the shape and dimensions of which were defined by the sacrificial core 10.

In order to avoid possible chemical interactions between the matrix and the fibers (if the latter are not protected) of the part to be manufactured and the sacrificial core during the manufacturing method, a diffusion barrier layer can be formed on the external surface of the core before the injection of the raw material. By way of non-limiting example, the diffusion barrier can consist of a boron nitride layer. In the case of metal bases, it is possible to deposit alumina or tungsten as a barrier layer).

The method of the invention allows to easily and reproducibly produce hollow parts made of composite with a short fiber ceramic matrix (CMC-FC), the fibers being coated with an interphase and optionally with a protective layer of the interphase or of short fiber metal matrix material (MMC-FC), even for small parts, which is not possible with continuous fibers. The invention finds a particular but not exclusive application in the manufacture of hollow parts of small gas turbine dimensions such as, for example, outlet guide vanes or "OGV" used in turbine distributor stages.

The invention claimed is:

1. A method for manufacturing a hollow part made of ceramic matrix composite, comprising:
   preparing a raw material comprising at least short fibers and a ceramic matrix precursor charge, the short fibers having a length comprised between 50 mm and 100 mm,
   positioning a sacrificial core in a molding cavity of injection-molding equipment, the molding cavity having dimensions larger than dimensions of the sacrificial core,
   shaping the raw material by injection molding said raw material into a free space between the sacrificial core and an internal wall of the molding cavity so as to obtain a green part comprising the sacrificial core and a shaped raw material,
   extracting the green part from the injection-molding equipment,
   densifying the raw material by flash sintering of the green part so as to transform the charge into a ceramic matrix, removing the sacrificial core so as to obtain a hollow part made of ceramic matrix composite;
wherein the sacrificial core is coated with a flexible graphite sheet, with a graphite layer deposited by spraying or with a boron nitride paint layer before the step of injecting the raw material, and
wherein the sacrificial core has a geometry capable of being unmolded from the densified raw material after said densifying.

2. The method according to claim 1, wherein the sacrificial core is made with one of the following materials: graphite, zirconia and alumina.

3. The method according to claim 1, wherein the raw material comprises a ceramic matrix precursor charge and short fibers made of a material selected from one of the following materials: carbon, silicon carbide and alumina.

4. The method according to claim 1, wherein the raw material further comprises a binder, the method further comprising debinding the raw material before or during the densification of the raw material.

5. The method according to claim 4, wherein the debinding of the raw material is carried out within an equipment used for the flash sintering of the green part.

6. The method according to claim 1, wherein the sacrificial core comprises a body and one or more positioning pins or overlengths which extend from the body and which are configured to hold the sacrificial core in position in the injection-molding equipment.

\* \* \* \* \*